UNITED STATES PATENT OFFICE.

ALEXANDER A. EBERSON, OF ST. LOUIS, MISSOURI.

PAINT COMPOUND.

No. 862,888.  Specification of Letters Patent.  Patented Aug. 13, 1907.

Application filed February 6, 1905. Serial No. 244,498.

*To all whom it may concern:*

Be it known that I, ALEXANDER A. EBERSON, a citizen of the United States, residing at St. Louis, Missouri, have invented a certain new and useful Improvement in Paint Compounds, of which the following is a full, clear, and exact description, such as will enable others skilled in the art to which it appertains to make and use the same.

This invention relates to a new and useful improvement in paints or coloring pigments, the object being to impart to the finished product the properties and characteristics of red lead and to avoid the disadvantages connected with the use and manufacture of pure red lead.

In the manufacture of pure red lead it is customary to take the scraps and tailings accumulating in the factory and calcine the same together so as to save this waste, oxidizing the lead contained therein. This use of scraps and tailings reduces the cost of manufacture to a minimum. The lead used in the manufacture of red lead being dirty and containing foreign substances, will become impregnated with glazed lead and foreign particles in the finished red lead, which in many cases are objectionable. It frequently happens that instead of producing a finished product the small particles will contain a core or center of metallic lead, so that when the pigment is applied this metallic lead will not become firmly attached to the surface painted and red lead containing excessive oxidizing properties when mixed with linseed oil will dry to a very hard and brittle coat and consequently will peel and drop off.

As red lead is used largely for a coating for iron work, etc., to prevent the rusting of same, it is obvious that one of its chief functions is destroyed by the removal or dropping off of the metallic leaden particles or the peeling or cracking off of same.

My present invention is designed to correct the objections existing in commercial red lead as sold on the market by the use of a filler or body combined in certain proportions with the red lead, whereby the percentage of the metallic particles and the excessive oxidizing properties are proportionately decreased in the bulk of the finished product made according to my invention, and further, while my product possesses the good qualities of red lead so far as a heavy body, drying properties and permanency of color are concerned, the proportion of impurities and metallic particles in the finished product is reduced to about one-third of the quantity of such particles existing in commercial red lead. My improved product also possesses the advantage that when used for certain purposes, such as for all general painting purposes, it will surpass in durability, rust-proof and corrosive qualities ordinary commercial lead oxid.

To make 1,510 pounds of my improved paint, I proceed in the following manner—In a suitable vat into which 500 pounds of lead oxid and 1,000 pounds of colored permanent red barytes of proper shade in the form of an impalpably fine powder is placed, the lead oxid and barytes is thoroughly mixed and while mixing this mass I add about twenty gallons of water in which have been dissolved 5 pounds of sal-soda. The mass is again thoroughly mixed and about 20 gallons of water into which have been dissolved 5 pounds of borax are now added, the sal-soda and borax thoroughly assimilating and fixing the mass of previously stained barytes and lead oxid, after which this mass is then run through a grinding mill so that it is thoroughly mixed and ground. The resulting product is a pasty mass possessing the color of red lead and this is placed in the usual drying pans for the purpose of evaporating the water.

Having thus described the invention, what is claimed as new and desired to be secured by Letters Patent is:

A paint compound consisting of 500 pounds of red lead and 1,000 pounds permanent red colored barytes having a fixed color corresponding to that of the red lead, thoroughly mixed with 5 pounds sal-soda dissolved into 20 gallons of water and 5 pounds borax dissolved in 20 gallons of water.

In testimony whereof, I hereunto affix my signature, in the presence of two witnesses this fourth day of February 1905.

ALEXANDER A. EBERSON.

Witnesses:
 B. F. FUNK,
 GEORGE BAKEWELL.